(12) United States Patent
Luo

(10) Patent No.: US 11,217,083 B1
(45) Date of Patent: Jan. 4, 2022

(54) INTELLIGENT CAMERA CHILD DETECTION SYSTEM

(71) Applicant: Kristopher Luo, Chandler, AZ (US)

(72) Inventor: Kristopher Luo, Chandler, AZ (US)

( * ) Notice: Subject to any disclaimer, the term of this patent is extended or adjusted under 35 U.S.C. 154(b) by 0 days.

(21) Appl. No.: 17/073,395

(22) Filed: Oct. 18, 2020

(51) Int. Cl.
*G08B 21/22* (2006.01)
*G08B 21/24* (2006.01)
*G08B 21/02* (2006.01)
*G06N 3/08* (2006.01)
*G06K 9/00* (2006.01)
*G08B 3/00* (2006.01)

(52) U.S. Cl.
CPC ......... *G08B 21/24* (2013.01); *G06K 9/00838* (2013.01); *G06N 3/08* (2013.01); *G08B 3/00* (2013.01); *G08B 21/0294* (2013.01)

(58) Field of Classification Search
CPC ...... G08B 21/24; G08B 21/0294; G08B 3/00; G08B 21/22; G08B 21/028; G08B 21/0291; G06K 9/00838; G06N 3/08; B60N 2/002; B60N 2/26
See application file for complete search history.

(56) References Cited

U.S. PATENT DOCUMENTS

| | | | | |
|---|---|---|---|---|
| 5,983,147 A * | 11/1999 | Krumm | ........... | G06K 9/00838 701/45 |
| 9,384,647 B1 * | 7/2016 | Arnold | ........... | G08B 21/02 |
| 2004/0090525 A1 * | 5/2004 | Eichmann | ........ | G08B 13/19647 348/148 |
| 2009/0091617 A1 * | 4/2009 | Anderson | ........... | H04N 5/2628 348/143 |
| 2009/0174774 A1 * | 7/2009 | Kinsley | ........... | B60R 1/00 348/148 |
| 2014/0015971 A1 * | 1/2014 | DeJuliis | ........... | A61B 5/6893 348/148 |
| 2014/0118548 A1 * | 5/2014 | Veneziano | ........... | H04N 5/2256 348/148 |
| 2015/0332578 A1 * | 11/2015 | Borgne | ........... | B60N 2/002 340/667 |
| 2016/0096116 A1 * | 4/2016 | Dunn | ........... | A63H 33/006 446/227 |
| 2017/0263098 A1 * | 9/2017 | Garcia | ........... | G08B 21/0202 |
| 2018/0232639 A1 * | 8/2018 | Lin | ........... | G06N 3/08 |
| 2019/0102635 A1 * | 4/2019 | Yamamoto | ........... | B60R 1/00 |
| 2019/0197325 A1 * | 6/2019 | Reiley | ........... | G08B 21/24 |
| 2020/0111339 A1 * | 4/2020 | Holt | ........... | G08B 21/0476 |
| 2020/0394428 A1 * | 12/2020 | Turcot | ........... | G06K 9/00832 |
| 2021/0114485 A1 * | 4/2021 | Ito | ........... | G06K 9/00624 |
| 2021/0245771 A1 * | 8/2021 | Golov | ........... | B60H 1/00657 |

* cited by examiner

*Primary Examiner* — An T Nguyen
(74) *Attorney, Agent, or Firm* — Keith L. Jenkins, Registered Patent Attorney LLC; Keith L. Jenkins

(57) ABSTRACT

The Intelligent Car Seat Camera Monitor is an alarm system. The Intelligent Car Seat Camera Monitor is constructed for use with a child car seat. Intelligent Car Seat Camera Monitor: a) detects when a child occupies the car seat; b) detects the driver side door opening; c) and deploys an audible alarm. The Intelligent Car Seat Camera Monitor comprises of a CPU, camera module, display, speaker, door sensor, and control buttons. The speaker activates a loud audible alarm when the camera has detected a child and the driver's door has been opened. The Intelligent Car Seat Camera Monitor utilizes real-time machine learning and model training to detect the child in the car seat, and it can be retrained to improve accuracy.

20 Claims, 6 Drawing Sheets

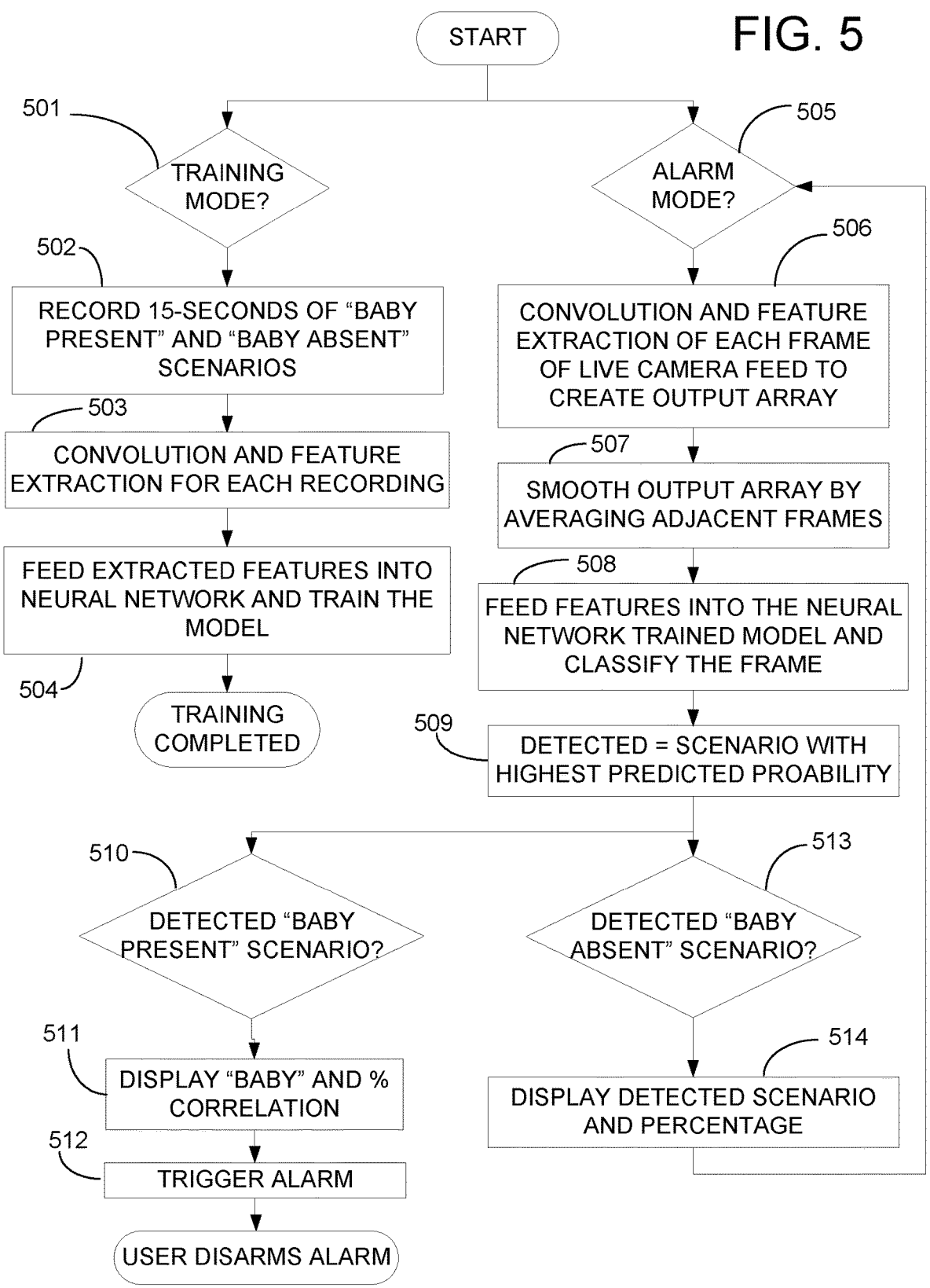

INTELLIGENT CAMERA CHILD DETECTION SYSTEM

REFERENCES CITED

Other Publications

CS231n Convolutional Neural Networks for Visual Recognition, Stanford, https://cs231n.github.io/convolutional-networks/A. W. Harley, "An Interactive Node-Link Visualization of Convolutional Neural Networks," in International Symposium on Visual Computing, pages 867-877, 2015.

BACKGROUND OF THE INVENTION

With rising global temperatures, more and more children are dying from being left in cars at an unsafe temperature. Other inventions focus on cooling the car's temperature instead of alerting the parent to retrieve their child. This fails because the cooling system is finite and does not alert the parent to retrieve the child so the cooling system will eventually fail and the child will die in spite of the system. Another flaw that exists in many other inventions is that the invention is permanently integrated into a car seat, so once the child grows and requires a new seat, the system will not transition to the next car seat. My invention is portable and is not integrated into a car seat. This not only makes it grow-compatible, but it is also is less costly and the consumer can freely select a car seat.

Machine learning libraries allow engineers and developers to create real-world smart inventions, such inventions include Tesla and Google's self-driving cars, facial recognition, and even speech-text translation. One advantage machine learning has over sensors and data-driven methods is that it improves over time. The more data a machine learning system receives, the better and more accurate the machine learning will become. Machine learning libraries such as Tensorflow, PyTorch, and NumPy must be used with the code of the system to enable the extraction of features from the camera frames.

BRIEF SUMMARY OF THE INVENTION

The Intelligent Camera Child Detection System has a camera sensor connected to a CPU equipped with machine learning software to detect the presence of the child. The driver simply plugs the power cord into the cigarette lighter socket to power the Intelligent Camera Child Detection System, and then place the Intelligent Camera Child Detection System on the back of the driver seat's headrest, facing the child and the car seat. In the case of rear facing car seat located in one of the rear passenger seats, the system should be placed on the headrest of the passenger seat.

When the vehicle is started, the Intelligent Camera Child Detection System powers on and activates. It detects whether there is a child inside the vehicle by feeding live video data from its camera into a machine learning neural network. By using a limit switch attached to the door frame, the system also detects if the door has been opened. When the vehicle is turned off, the system is powered by its internal rechargeable battery. When a child is detected and the door is opened, the system activates a loud audible alarm alerting the driver of his/her child.

BRIEF DESCRIPTION OF THE DRAWINGS

FIG. 5 is a flow chart showing the algorithm for the current invention.

DETAILED DESCRIPTION AND BEST MODE OF IMPLEMENTATION

Figure 2:
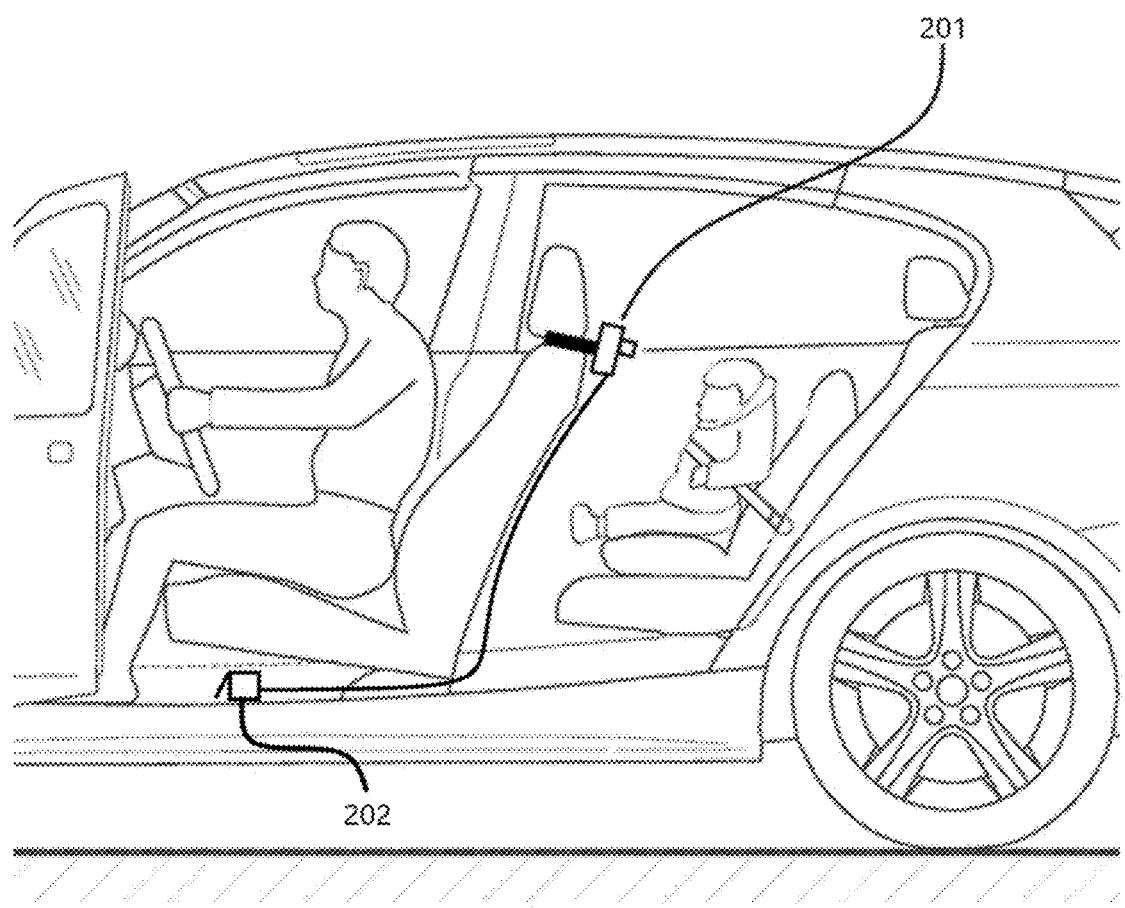
FIG. 2 presents an environmental view of the invention, attached to the driver seat headrest, facing the child.
Figure 3:
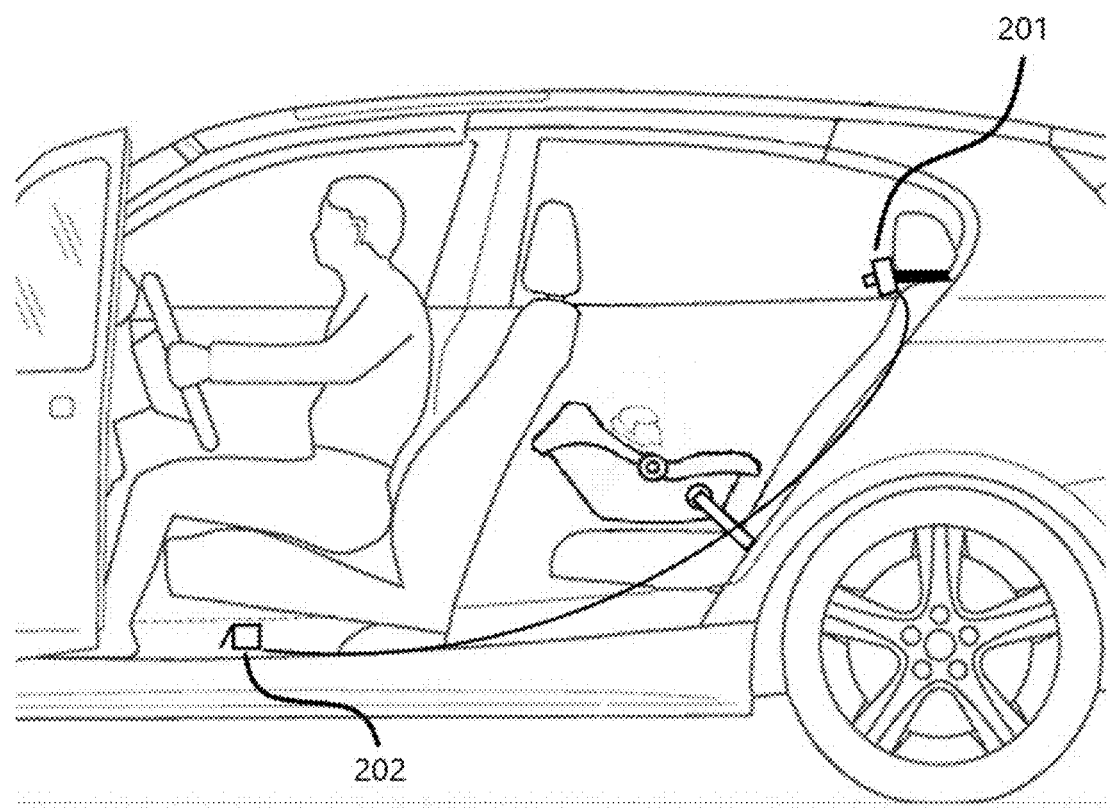
FIG. 3 presents an alternate environmental view of the invention, attached to the rear passenger seat headrest, facing the child.
Figure 4:
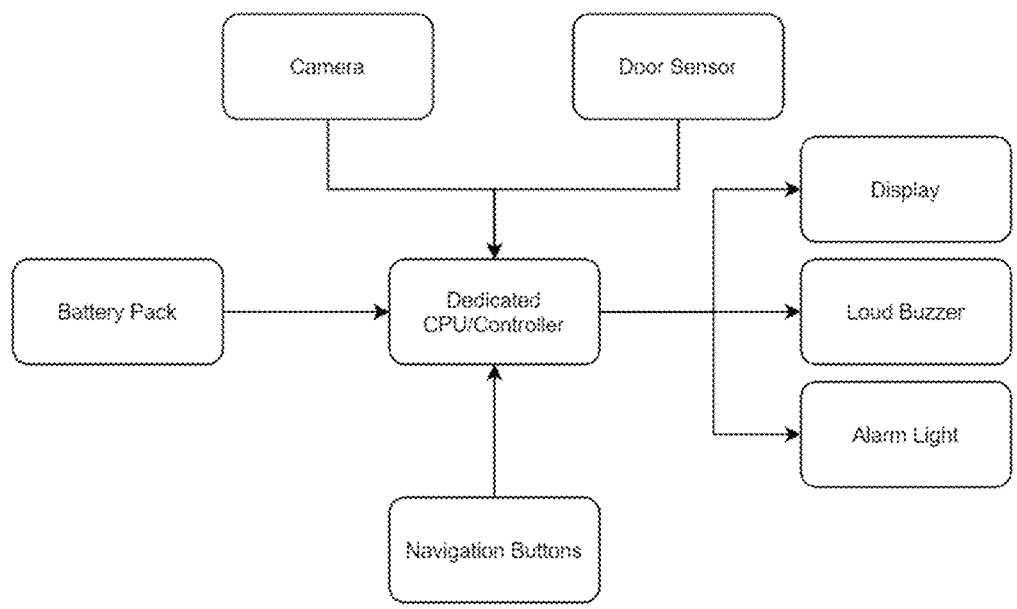
FIG. 4 shows a schematic view of the overall system in accordance with the invention.

The best mode of implementation for the Intelligent Camera Child Detection System 201 is shown in FIG. 2. The Intelligent Camera Child Detection System is attached onto the back of the driver seat headrest or the passenger seat headrest but must be facing the child and the car seat, so the child is in the camera's field of view. The Intelligent Camera Child Detection System derives power from the car's electrical system by connecting an adapter to the cigarette lighter socket of the car. In case of rear facing car seats, FIG. 3 shows the mode of implementation for such car seats.

Figure 1A:
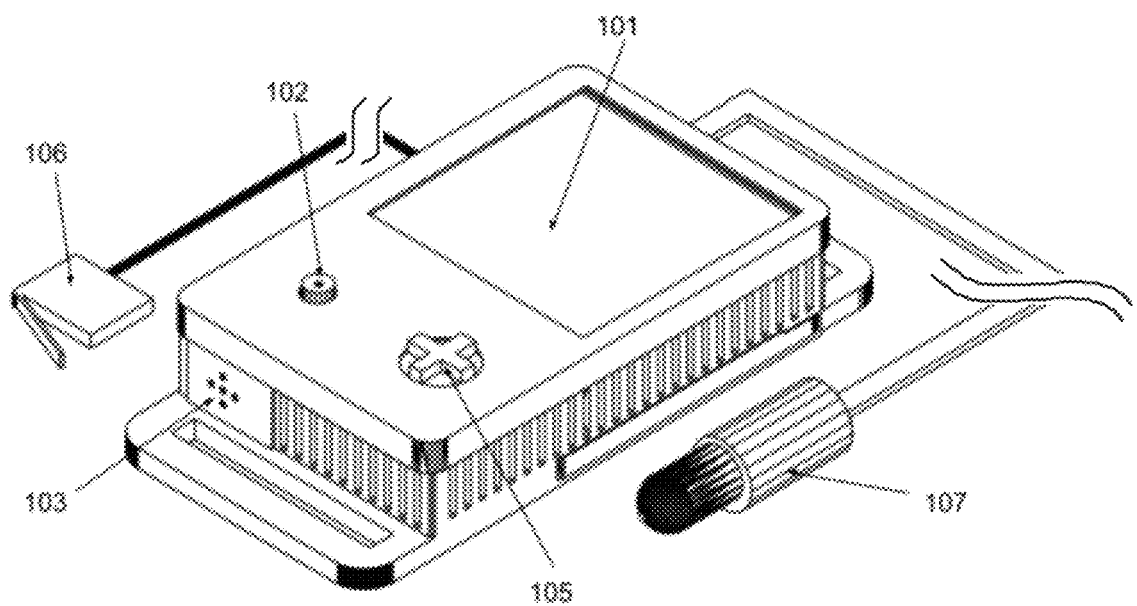
FIG. 1A shows an isometric perspective view of the Intelligent Camera Child Detection System.
Figure 1B:
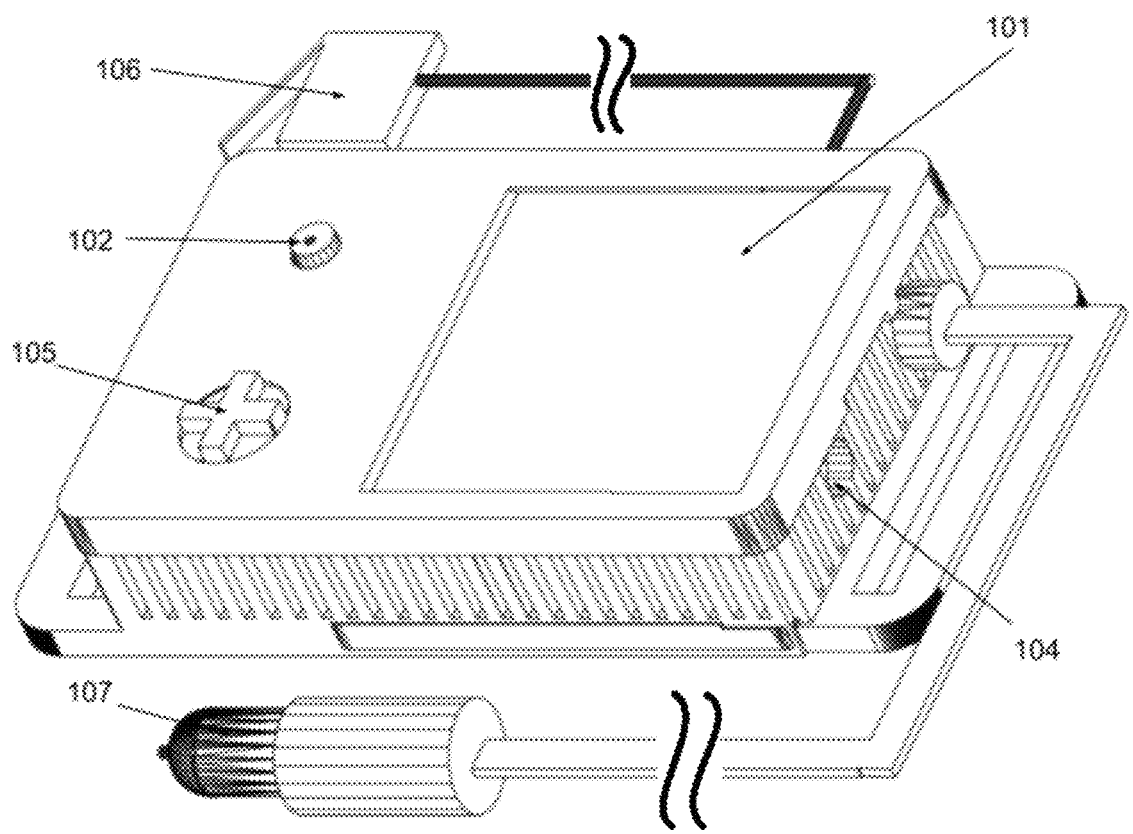
FIG. 1B shows an alternate isometric perspective view of the Intelligent Camera Child Detection System.

The Intelligent Camera Child Detection System, shown in FIGS. 1A and 1B, consists of a CPU with memory which is enclosed (not depicted in FIG. 1) and controls the components of the Intelligent Camera Child Detection System through a software program; a 2.5" display 101 that displays the system menu and camera view; a camera 102 that records the child and inputs video data into the program; a limit switch door sensor 106 which is attached to the driver door frame to detect when the door has been opened; a loud speaker 103 and LED 104 that alert the driver of the unattended child in a car seat; navigation buttons 105 that allow the user to interact with the menu; an adapter 107 that connects the system electrically to the vehicle's electrical system; and a rechargeable battery pack that powers the system after the vehicle has been turned off. FIG. 1B displays an alternate view of the Intelligent Camera Child Detection System. As shown in FIG. 1A and FIG. 1B, the Intelligent Camera Child Detection System is a self-contained system, allowing portability and adaptability to vehicles that lack modern electronics, such as CAN connectivity. No connections to devices outside of the vehicle are used.

On starting the vehicle, the Intelligent Camera Child Detection System powers on. The display 102, shows an on-screen control menu allows the user to select between two modes, training mode or alarm mode, with the latter being the default mode. After the vehicle has been powered off, the Intelligent Camera Child Detection System will stop deriving power from the vehicle's electrical system and use the battery pack to power the system and any alerts.

In training mode, as shown in FIG. 5, the CPU first records 501 two video data sets: baby present and baby absent scenarios. The CPU first records 15-second recordings of each scenario 502. Next, the CPU performs digital convolution on the video data recording and extracts features 503. It then creates a neural network model with the extracted features 504. This model is stored in memory to be used for the alarm mode.

After the model has been trained, the driver should try testing the alarm mode to make sure the training was correctly executed. If the Intelligent Camera Child Detection System does not detect the child when present or if the model detection of the child is inconsistent, the model can be re-trained. Re-training can also improve the accuracy of the model.

In the training mode, The Intelligent Camera Child Detection System can be trained on using other video data sets depicting different scenarios, such as presence or absence of pets.

In the alarm mode 505, the CPU retrieves the model and uses the model to identify if a child is present and activate the alarm upon the parent leaving. The CPU performs convolution on the live video data and extracts features. The resulting features are fed into the neural network model and a probability percentage is calculated 508. The percent probability is dispersed amongst the 2 scenarios: Baby present and baby absent. Whichever scenario has the highest percentage probability is the scenario that is detected 509. If the "baby present" scenario is selected and the driver side door is opened 510, the audible alert is activated 512. The alert is deactivated once the child is removed. If the other scenario is detected, the alarm will not be activated 513, 514.

The following definitions were using in this disclosure:
Buzzer/Speaker—As used in this disclosure, a buzzer is a sound-emitting device.
Car seat/Child safety seat—As used in this disclosure, a car seat is a safety device configured for use with an automobile. The child safety seat is restraining device that protects a child from injury during an automobile crash or other such event.
Baby/Child—As used in this disclosure, the two terms are used interchangeably to describe a child passenger seated in a car seat inside of a vehicle.
CPU—As used in this disclosure, a CPU is a device that controls all other components of the enclosure through code and allows the user/developer to interface with the CPU. The CPU also contains a memory unit to store digital information.
Door sensor—As used in this disclosure, a door sensor is a limit switch sensor attached to the door. When pressed, the sensor will output a signal that indicates the door has been closed.
Camera—As used in this disclosure, a camera is a optical sensor that records and outputs video signals.
Display—As used in this disclosure, a display is a surface upon which is presented a graphic image or text.
Casing—As used in this disclosure, a casing is a structure specifically constructed to contain the components of the Intelligent Camera Child Detection System.
Model—As used in this disclosure, a model is a neural network that underwent the training process.
Prediction probability—As used in this disclosure, probability is a quantitative measure of two or three independent events. It is expressed as a percentage between 0 and 100. In this disclosure, probability measures the similarity between features in the live video data and the features in the data that trained the model.
Real-time training of a neural network model—As used in the disclosure, training takes place when a driver mounts the Intelligent Camera Child Detection System in his vehicle and uses video data at the time of system deployment. This is distinctively different from the past pattern recognition systems that typically are modeled and trained in a laboratory or other controlled settings different from the deployment environment.

With respect to the above description, it is to be realized that the optimum dimensional relationship for the various components of the invention described above in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

As such, those skilled in the art will appreciate that the conception, upon which the disclosure is based, may be readily utilized as a basis for the design of other inventions. Therefore, the description must be regarded as including such equivalent constructions.

Further, the purpose of the abstract is to give the U.S. Patent and Trademark Office, the public, and other pioneers a brief summation of the invention.

I claim:

1. An intelligent alarm system responsive to detection of a child passenger in a car seat in a vehicle, comprising a self-contained portable said intelligent alarm system further comprising:
   a. a portable casing configured to be manually attached to a car seat by a user;
   b. a video camera mounted in said casing and operable to take first and second video signal data sets of said car seat and said child passenger in said car seat, respectively;
   c. a loudspeaker supported in said casing operable to provide an audible alarm when an unattended child passenger is detected in a car seat;
   d. a display mounted on said casing configured to display video from said video camera and to display a control menu;
   e. a plurality of navigation buttons mounted on said casing operable to enable a user to select items from said control menu;
   f. a rechargeable battery pack within said casing;
   g. a CPU with a memory unit within said casing, wherein said memory unit is operable to store:
      i. said first and second video signal data sets;
      ii. software loadable into said CPU and there operable to:
         (1) control said video camera;
         (2) control said display and said menu;
         (3) control responses to user inputs through said navigation buttons;
         (4) detect a state of a car door sensor;
         (5) capture and store said two video signal data sets in real time;
         (6) train a neural network in real time using only said video signal data set of said car seat and said video signal data set of said child passenger in said car seat;
         (7) detect a presence of an unattended said child passenger in said child seat by feeding real-time video data into said neural network and performing video classification; and
         (8) activate said alarm responsive to said detection of said child passenger and an activation of said car door sensor;
   h. a power cord extending from said casing to a coupling operable to couple to an automotive electrical power socket, wherein said coupled power is operable to power all components of said alarm system and to recharge said battery pack; and
   i. said car door sensor coupled via wire to said casing and configured to be manually attached to a frame of said driver-side car door by said user.

2. The system of claim 1, said casing is operable to be attached either to a back of a driver seat head rest or a front of a passenger seat head rest, facing said car seat with said car seat in a field of view of said camera.

3. The system of claim 1, wherein said CPU is operable to perform said real-time training by creating said neural network model based on only said first and second fifteen-second-long video signal data sets with said second fifteen-second-long video signal data set containing video signals of said child passenger present in said car seat in said vehicle and said first fifteen-second-long video signal data set of said car seat in said vehicle without said child passenger present.

4. The system in claim 3, wherein said CPU is operable to store said trained neural network model in said memory and is operable to retrieve said trained neural network model from said memory at any later time.

5. The system of claim 4, wherein said CPU is operable to retrieve said trained neural network model for removal, re-creation, re-training, or updating when environmental variables have changed.

6. The system in claim 5, wherein said CPU is operable to retrieve said trained neural network model from said memory and to feed said live video signal data sets from said video camera through said trained neural network model to determine a presence or an absence of said child passenger.

7. The system in claim 1, wherein said CPU detects an opening of said driver side door when said door sensor is activated.

8. The system in claim 7, wherein said CPU alerts a driver with said audible alarm, when said child passenger presence is detected, and said door sensor detects an opening of said driver side door.

9. The system in claim 8, wherein said CPU disables said audible alarm when said driver manually dismisses said alarm.

10. An intelligent alarm system responsive to detection of a child passenger in a car seat in a vehicle, comprising a self-contained portable said intelligent alarm system further comprising:
 a. a portable casing configured to be manually attached to said car seat by a user;
 b. a video camera mounted in said casing and operable to:
  i. form a first fifteen-second-long video signal data set of said car seat;
  ii. form a second fifteen-second-long video data set of said child passenger in said car seat;
  iii. produce real-time video data; and
  iv. to be manually oriented by said user such that said video camera has said car seat in a field of view of said video camera;
 c. a CPU with a memory unit within said casing, wherein said memory unit stores:
  i. said first and second fifteen-second-long video signal data sets;
  ii. software loadable into said CPU and there operable to:
   (1) control said video camera;
   (2) capture and store said first and second fifteen-second-long video signal data sets in real time;
   (3) train a neural network in real time using only said first fifteen-second-long video signal data set and said second fifteen-second-long video signal data set; and
   (4) detect a presence of an unattended said child passenger in said child seat by feeding said real-time video data into said neural network and performing video classification;
 d. a car door sensor coupled via signal wire to said casing and configured to be manually attached to a frame of said driver-side car door by said user.

11. The system of claim 10, wherein said CPU:
 a. performs initial real-time training by creating and storing in said memory said trained neural network model based only on said first and second fifteen-second-long video signal data sets; and
 b. subsequently retrieves said trained neural network model from said memory and feeds real-time video signal data from said video camera through said trained neural network model to determine a presence or an absence of said child passenger.

12. The system of claim 10, comprising:
 a. a loudspeaker supported in said casing operable to provide a manually suppressible audible alarm when said unattended child passenger is detected in a car seat and said car door sensor is activated;
 b. a manually suppressible alarm light supported in said casing operable to provide a visual alarm when said unattended child passenger is detected in a car seat;
 c. a display on said casing configured to display video from said video camera and to display a control menu;
 d. a plurality of navigation buttons on said casing operable to enable a user to select items from said control menu and to suppress said alarms; and
 e. a rechargeable battery pack within said casing.

13. The system of claim 11, comprising: a power cable extending from said casing to a coupling operable to couple to an automotive electrical power socket, wherein said coupled power is operable to power all components of said alarm system and to recharge said battery pack.

14. The system of claim 12, wherein said battery pack is configured to provide power to said system for a predetermined amount of time after automotive electrical power becomes unavailable.

15. The system of claim 10, wherein said memory unit also stores software loadable on startup into said CPU and there operable to:
 a. control a display mounted on said casing and a menu presentable on said display;
 b. control responses to user inputs through at least one navigation button mounted on said casing; and
 c. detect a state of said car door sensor wired to said casing.

16. The system of claim 13, wherein said CPU is operable to activate said audible alarm and said visual alarm responsive to said detection of a presence of said unattended child passenger in said child seat.

17. An intelligent alarm system responsive to detection of a child passenger in a car seat in a vehicle, comprising a self-contained portable said intelligent alarm system further comprising:
 a. a portable casing configured to be manually attached to a vehicle seat by a user;
 b. a video camera mounted in said casing and operable to:
  i. have a field of view sized to view said car seat;
  ii. form a first video signal data set of said car seat;
  iii. form a second video data set of said child passenger in said car seat; and
  iv. produce real-time video data;
 c. a CPU with a memory unit within said casing, wherein said memory unit stores:
  i. said first and second video signal data sets;
  ii. software loadable into said CPU and there operable to:
   (1) control said video camera;

(2) capture and store, in real time, said first video data set and said second video signal data set;
(3) train a neural network in real time using only said first video signal data set and said second video signal data set; and
(4) detect a presence of an unattended said child passenger in said child seat by supplying said real-time video data into said neural network and performing video classification; and d. a car door sensor coupled via signal wire to said casing and configured to be manually attached to a frame of said driver-side car door by said user.

18. The system of claim 17, wherein said memory unit also stores:
a. said first and second video signal data sets;
b. software loadable on startup into said CPU and there operable to:
 i. control said video camera;
 ii. control a display mounted on said casing and a menu presentable on said display;
 iii. control responses to user inputs through at least one navigation button mounted on said casing; and
 iv. detect a state of said car door sensor wired to said casing.

19. The system of claim 17, wherein:
a. said first data set comprises a fifteen-second-long video data set;
b. said second data set comprises a fifteen-second-long video data set;
c. said CPU performs initial real-time training by creating and then storing in said memory said trained neural network model based only on said first and second fifteen-second-long video signal data sets;
d. said CPU subsequently retrieves said trained neural network model from said memory and feeds real-time video signal data sets from said video camera through said trained neural network model to determine a presence or an absence of said child passenger.

20. The system of claim 17, wherein said CPU is operable to activate a manually suppressible audible alarm mounted on said casing and a manually suppressible visual alarm mounted on said casing responsive to said detection of a presence of an unattended said child passenger in said child seat.

* * * * *